United States Patent
Jung et al.

(10) Patent No.: US 11,521,435 B2
(45) Date of Patent: Dec. 6, 2022

(54) METHOD AND DEVICE FOR DIAGNOSING PROBLEMATIC NOISE SOURCE BASED ON BIG DATA INFORMATION

(71) Applicants: HYUNDAI MOTOR COMPANY, Seoul (KR); KIA MOTORS CORPORATION, Seoul (KR)

(72) Inventors: In-Soo Jung, Suwon-si (KR); Dong-Chul Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 522 days.

(21) Appl. No.: 16/682,449

(22) Filed: Nov. 13, 2019

(65) Prior Publication Data
US 2020/0193735 A1    Jun. 18, 2020

(30) Foreign Application Priority Data

Dec. 12, 2018   (KR) .......................... 10-2018-0160084

(51) Int. Cl.
| | |
|---|---|
| G07C 5/06 | (2006.01) |
| G01H 1/00 | (2006.01) |
| G06N 3/04 | (2006.01) |
| G10L 25/51 | (2013.01) |
| G06N 3/08 | (2006.01) |

(52) U.S. Cl.
CPC ................. *G07C 5/06* (2013.01); *G01H 1/00* (2013.01); *G06N 3/0454* (2013.01); *G06N 3/08* (2013.01); *G10L 25/51* (2013.01)

(58) Field of Classification Search
USPC ........................................................ 701/33.4
See application file for complete search history.

(56) References Cited

U.S. PATENT DOCUMENTS

| | | | |
|---|---|---|---|
| 10,223,842 B1 * | 3/2019 | Lee | ..................... G07C 5/0808 |
| 2005/0066730 A1 | 3/2005 | Raichle | |
| 2006/0122810 A1 | 6/2006 | Clarke et al. | |

(Continued)

FOREIGN PATENT DOCUMENTS

| | | |
|---|---|---|
| DE | 10-2017-221701 A1 | 4/2019 |
| JP | 2013-200143 A | 10/2013 |

(Continued)

OTHER PUBLICATIONS

Extended European Search Report dated May 18, 2020 issued in European Patent Application No. 19208486.1.

*Primary Examiner* — Tyler D Paige
(74) *Attorney, Agent, or Firm* — Morgan, Lewis & Bockius LLP

(57) ABSTRACT

A method for diagnosing a problematic noise source based on big data information include: measuring noise data of a powertrain of a vehicle by using a real-time noise measurement device, and converting the noise data into a signal that can be input to a portable device for diagnosing the problematic noise source through an interface device; analyzing a noise through a deep learning algorithm of an artificial intelligence on a converted signal, and diagnosing the problematic noise source as a cause of the noise; and displaying the cause of the noise by outputting a diagnostic result as the problematic noise source, and transmitting the diagnostic result to the portable device.

13 Claims, 3 Drawing Sheets

(56) References Cited

U.S. PATENT DOCUMENTS

| | | | |
|---|---|---|---|
| 2015/0339570 A1* | 11/2015 | Scheffler | ............... G06N 3/10 |
| | | | 706/27 |
| 2016/0071336 A1 | 3/2016 | Owen et al. | |
| 2017/0076514 A1* | 3/2017 | Valeri | ............... G05B 23/00 |
| 2018/0300962 A1 | 10/2018 | De La Mora Molina et al. | |
| 2019/0114849 A1 | 4/2019 | Lee et al. | |
| 2020/0118358 A1* | 4/2020 | Lee | ............... G06N 20/00 |
| 2020/0193291 A1* | 6/2020 | Lee | ............... G05B 23/024 |

FOREIGN PATENT DOCUMENTS

| | | |
|---|---|---|
| KR | 10-1996-0012078 B1 | 9/1996 |
| KR | 2004-0003426 A | 1/2004 |
| KR | 10-1371312 A | 11/2013 |
| KR | 10-2018-0029320 A | 3/2018 |
| KR | 10-1864860 B1 | 6/2018 |
| KR | 10-2019-0042203 A | 4/2019 |
| WO | 2006/120550 A2 | 11/2006 |

* cited by examiner

METHOD AND DEVICE FOR DIAGNOSING PROBLEMATIC NOISE SOURCE BASED ON BIG DATA INFORMATION

CROSS-REFERENCE(S) TO RELATED APPLICATIONS

This application claims priority to Korean Patent Application No(s). 10-2018-0160084, filed on Dec. 12, 2018, which is incorporated herein by reference in its entirety.

TECHNICAL FIELD

The present disclosure relates to a technology for diagnosing a problematic noise source of vehicle noise, particularly atypical noise such as noise of a power train by an artificial intelligence based on deep learning, based on big data information.

BACKGROUND

A vehicle is composed of a number of parts assembled together. Among the assembled parts, a power system of the vehicle has inherent noise and vibration characteristics.

However, noise information generated by combination of the parts is enormous. Further, working noise in a normal situation and problematic noise appearing in an abnormal situation appear differently. If any problematic noise appears, the vehicle is probably placed in an abnormal condition.

It is difficult to determine which part of the vehicle is broken down only based on problematic noise information generated by the vehicle having a very complicated structure.

For example, in the case of a power train of the vehicle, it is very difficult to find a region where the problematic noise occurs. This is because such problematic noise of the vehicle occurs atypically.

Therefore, noise experts have diagnosed noise through evaluation of sound detection and found a problematic noise source in view of their past experiences.

However, it takes a relatively long time to perform such a diagnosis even if multiple noise experts used sensors or other test conditions. Further, it is difficult to diagnose the problematic noise source correctly.

Recently, efforts have been made to find a problematic noise source using noise data but there is no proper solution.

Especially, there is no portable device for finding a problematic noise source using noise data.

SUMMARY OF THE DISCLOSURE

It is an object of the present disclosure to provide a method and a device for diagnosing a problematic noise source based on big data information for identifying a problematic noise source, which maximizes an asset value of noise big data in which noise data is accumulated by type using an artificial intelligence technique.

Other objects and advantages of the present disclosure can be understood by the following description and become apparent with reference to the embodiments of the present disclosure. It is obvious to those skilled in the art to which the present disclosure pertains that the objects and advantages of the present disclosure can be realized by the means as claimed and combinations thereof.

In accordance with one aspect of the present disclosure, a method for diagnosing a problematic noise source based on big data information comprises: measuring noise data of a powertrain of a vehicle by using a real-time noise measurement device and converting the noise data into a signal that can be input to a portable device through an interface device; analyzing a noise through a deep learning algorithm of an artificial intelligence on a converted signal and diagnosing the problematic noise source as a cause of the noise; displaying the cause by outputting a diagnostic result as the problematic noise source and transmitting the diagnostic result to a portable device.

In accordance with another aspect of the present disclosure, a method for diagnosing a problematic noise source based on big data information comprises: acquiring noise or vibration data of a vehicle and converting the noise or vibration data into noise and then converting the noise into a first code; converting information of engine speed emerged from controller area network (CAN) data of the vehicle into the first code; and diagnosing the problematic noise source based on the first code by deep learning of an artificial intelligence.

The noise data is acquired through a microphone and the vibration data is acquired through a vibration sensor.

A bidirectional method and a gated recurrent unit (GRU) technique are applied to the deep learning of the artificial intelligence.

An attention mechanism technique is applied to the deep learning of the artificial intelligence.

An early stage ensemble learning technique is applied to the deep learning of the artificial intelligence.

The artificial intelligence outputs the result of diagnosing the problematic noise source through a portable device and is configured to be capable of reproducing a sound for identification.

In accordance with another aspect of the present disclosure, a method for diagnosing a problematic noise source based on big data information comprises: preparing external storage data outside a vehicle; acquiring external storage data outside the vehicle and converting the acquired data into a second code through resampling; and diagnosing a problematic noise source out of noise or vibration based on the second code by deep learning of an artificial intelligence.

A frequency of the resampling is twice a maximum frequency of the problematic noise.

A bidirectional method and a gated recurrent unit (GRU) technique are applied to the deep learning of the artificial intelligence.

An attention mechanism technique is applied to the deep learning of the artificial intelligence.

An early stage ensemble learning technique is applied to the deep learning of the artificial intelligence.

The artificial intelligence outputs the result of diagnosing the problematic noise source through a portable device and is capable of reproducing a sound for identification.

The external storage data outside the vehicle is transmitted to the CAN data of the vehicle by Bluetooth.

In accordance with still another aspect of the present disclosure, a device for diagnosing a problematic noise source based on big data information comprises: a microphone for measuring noise of a vehicle; a vibration sensor for acquiring vibration data of the vehicle; a controller area network (CAN) module for acquiring an engine speed of the vehicle; and a controller for converting data regarding noise, vibration, and engine speed into codes and receiving a diagnosis result from an artificial intelligence wherein the artificial intelligence diagnoses the problematic noise source based on the codes by deep learning.

In accordance with yet another aspect of the present disclosure, a device for diagnosing a problematic noise source based on big data information comprises: an input data collector for collecting input data, the input data collector comprising a microphone for measuring noise of a vehicle, a vibration sensor for acquiring vibration data of the vehicle, a controller area network (CAN) module for acquiring an engine speed of the vehicle, and a memory for storing problematic noise regions from noise, vibration and engine speed data; a controller for converting the data into codes and receiving a diagnosis result from an artificial intelligence; and a problematic noise diagnosis unit for diagnosing the problematic noise source based on the codes by deep learning of the artificial intelligence, wherein the input data collector and the problematic noise diagnosis unit are separable from each other.

Advantageous effects of the embodiments of the present disclosure are as follows:

First, as the concept of a multiple diagnosis system that can output a diagnosis result with respect to noise sources to be input from 1 to n orders in a stochastic manner is applied to the embodiments of the present disclosure in consideration of the point that complex noise sources of a power train are mixed with a problematic noise source, it is possible to diagnose even a problematic noise source that exhibits its characteristics weakly.

Second, as a model learned based on big data about the problematic noise is produced, it is possible to diagnose complex and atypical noise of a power train or a vehicle precisely in a stochastic manner.

Third, it is possible to diagnose the exact problematic noise source in a very short time.

Fourth, as the GRU, deep neural network (DNN), attention mechanism and early Stage ensemble learning algorithms are utilized, data in the past time is prevented from being lost.

Fifth, as the attention mechanism technique is applied to further impart weights of important parts of learning data, it is possible to establish an accurate learning model with respect to atypical noise.

Sixth, it is possible to efficiently improve effort required for data analysis and judgment by a person (professional engineer).

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
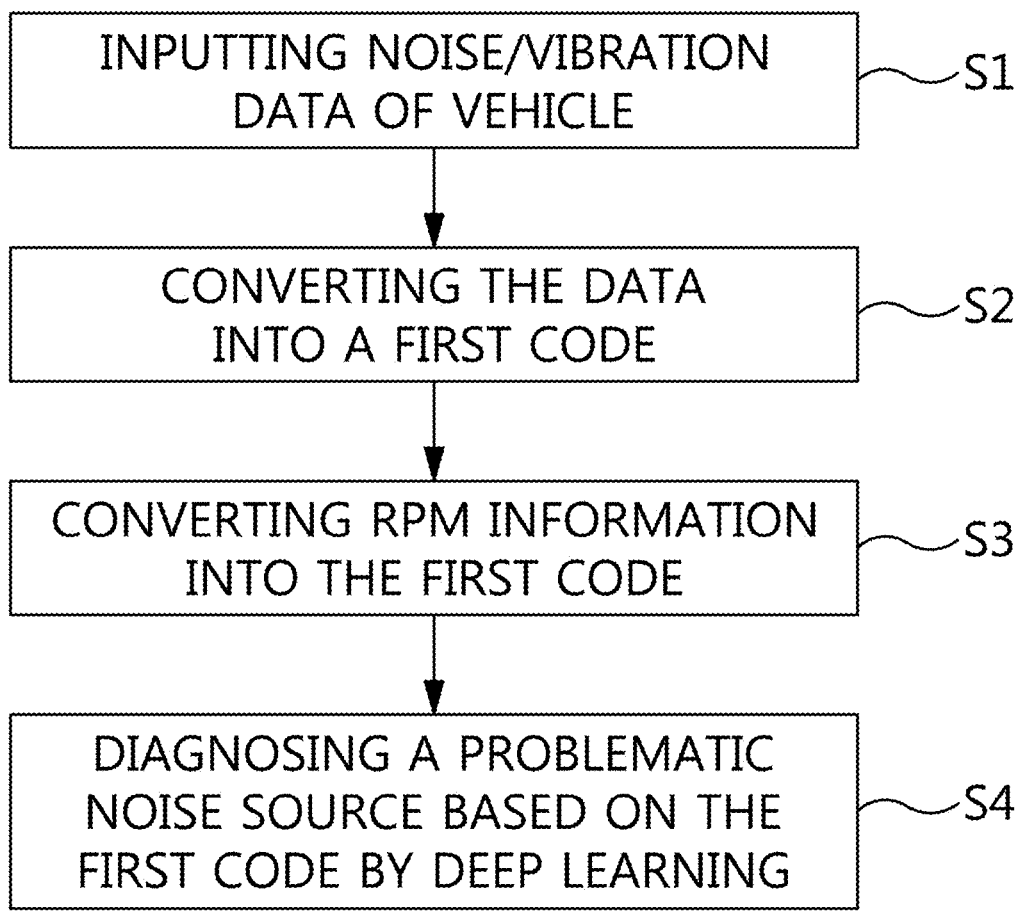
FIG. 1 is a flowchart illustrating general flow of a method for diagnosing a problematic noise source based on big data information according to an exemplary embodiment of the present disclosure.

The present disclosure may be implemented in many altered forms and have various embodiments. Therefore, an exemplary specific embodiment is illustrated in the drawings and described in detail in the following description. However, the disclosure herein is not intended to limit the present disclosure to a specific embodiment and should be understood as covering all modifications, equivalents and substitutions falling within the spirit and scope of the disclosure.

Like reference numerals are used to designate like elements throughout the drawings and the description with reference to the drawings.

Although the terms "first," "second," etc. may be used herein to describe various components, these components should not be limited by these terms. These terms are used merely to distinguish one element from another.

For example, a first component may be designated as a second component and similarly a second component may be designated as a first component without departing from the scope of the present disclosure. The term "and/or" includes all combinations or any of a plurality of the associated listed items.

All terms including technical or scientific terms, unless being defined otherwise, have the same meaning generally understood by a person having ordinary skill in the art pertaining to the present disclosure.

The terms that are the same as the ones defined in a commonly-used dictionary should be interpreted as including the meaning consistent with the meaning in the context of the related art and should not be interpreted as being ideally or excessively formal meaning unless they are explicitly defined otherwise herein.

Hereinafter, a method for diagnosing a problematic noise source based on big data information according to an exemplary embodiment of the present disclosure is described.

First, referring to FIG. 1, flow of the method for diagnosing a problematic noise source based on big data information according to the present disclosure is described.

FIG. 1 is a flowchart illustrating general flow of a method for diagnosing a problematic noise source based on big data information according to an exemplary embodiment of the present disclosure.

Figure 2:
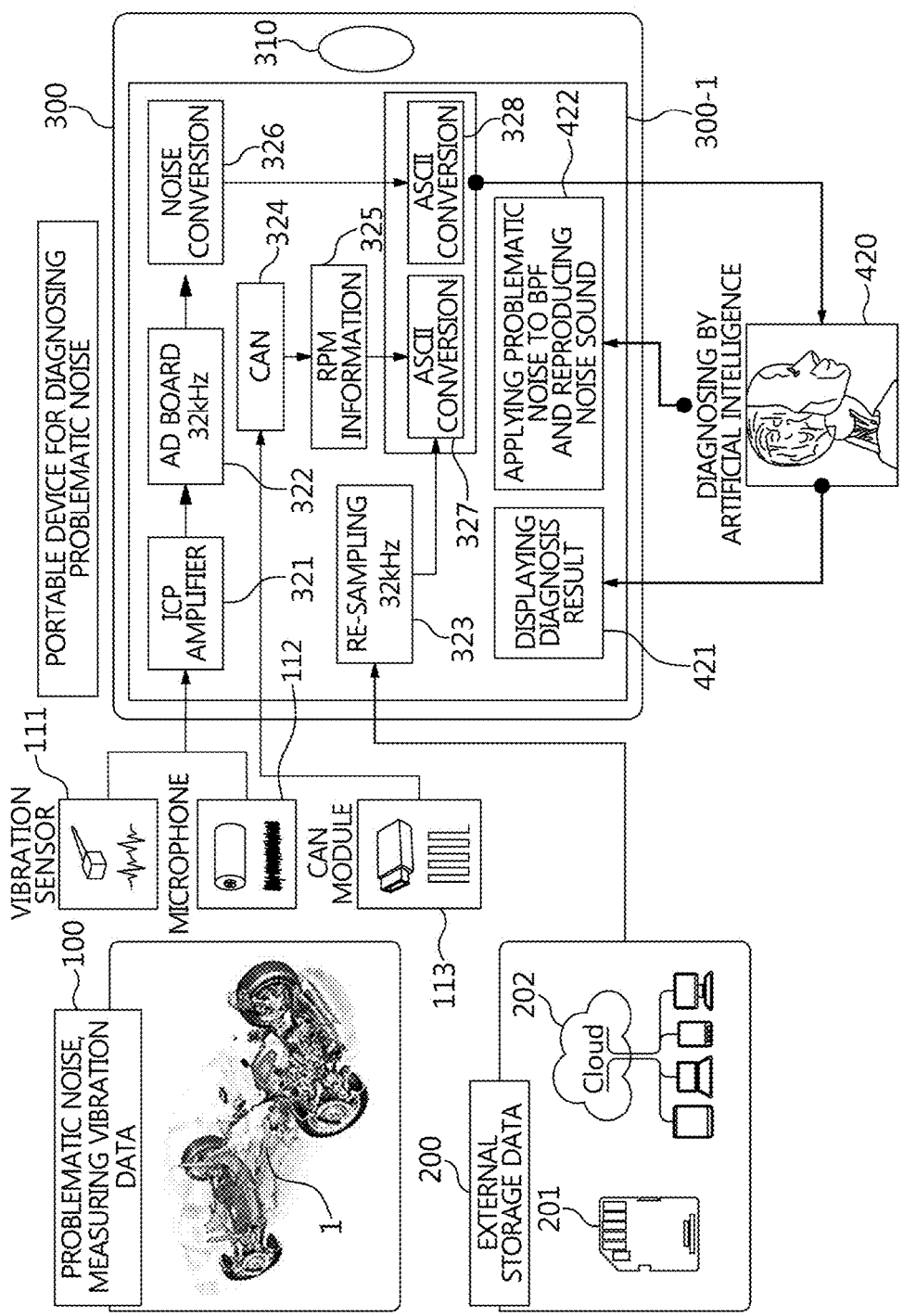
FIG. 2 is an algorithm diagram according to an exemplary embodiment of the present disclosure.

FIG. 2 is an algorithm diagram of a device for diagnosing a problematic noise source according to an exemplary embodiment of the present disclosure.

Noise and vibration data of a vehicle are firstly input by an input data collector 100 in step S1.

The noise or vibration data of the vehicle is converted into noise and then the noise is converted into a first code by a controller of a portable device in step S2.

Then, information of engine speed emerged from CAN data of the vehicle is converted into the first code by the controller in step S3.

Afterwards, a problematic noise source out of the noise or vibration is diagnosed based on the first code by deep learning of an artificial intelligence in step S4.

An exemplary embodiment of the present disclosure is described firstly.

FIG. 2 is a control logic according to an exemplary embodiment of the present disclosure. A device for diagnosing a problematic noise source of a vehicle 1 for a control logic according to an exemplary embodiment includes an input data collector 100, an external storage data 200, a portable device 300 (for example, a smart phone and a notebook), and an artificial intelligence 420.

The input data collector 100 comprises a vibration sensor 111, a microphone 112 and a Controller Area Network (CAN) module 113. The external storage data 200 comprises a memory 201 and cloud network 202.

The portable device 300 for diagnosing problematic noise includes a controller 300-1 and a problematic noise diagnosis unit 310. The controller 300-1 comprises an Integrated Circuit Piezoelectric (ICP) amplifier 321, an Analog/Digital (AD) board 322, a resampling unit 323, a CAN processing unit 324, a Revolutions Per Minute (RPM) information unit 325, a noise converter 326, a first ASCII conversion units 327, a second ASCII conversion units 328, a display unit 421 and a sound reproducing unit 422. The problematic noise diagnosis unit 310 may be a processor such as a computer, a central processing unit (CPU), etc.

The artificial intelligence 420 performs deep learning. Deep learning includes Bidirectional method, Gated Recurrent Unit, Recurrent Neural Network, Attention Mechanism, Bidirectional RNN (GRU), and Early stage ensemble, each of which is known in the art and therefore a detailed description thereof is omitted herein.

An algorithm according to an exemplary embodiment of the present disclosure generally follows the following procedures.

The noise data can be acquired through a microphone 112 in real-time while the vibration data can be acquired through a vibration sensor 111.

The vibration sensor 111 may be an accelerometer sensor.

One or more microphones 112 may be provided.

The ICP amplifier 321 is connected to the vibration sensor 111 and the microphone 112. The ICP amplifier 321 amplifies the vibration data input from the vibration sensor 111 and the noise data input from the microphone 112, and transmits the amplified noise and vibration data to the AD board 322.

The AD board 322 is an AD converter that converts the noise data and vibration data, which are analog signal, into signal of a digital form enabling learning of an artificial intelligence.

The noise converter 326 is connected to the AD board 322.

The CAN module 113 is connected to the CAN processing unit 324 of the controller 300-1. The CAN module 113 is a module for measuring operation conditions of the vehicle and a power train, which transmits a digital signal.

These noise data, vibration data, and CAN data are all converted into a first signal form in the first and second ASCII conversion units 327 and 328.

In other words, the CAN processing unit 324 outputs RPM information from the data input from the CAN module 113 to the ASCII conversion unit 327.

On the other hand, the noise data and vibration data are transmitted to the second ASCII conversion unit 328 via the noise converter 326.

At this time, the resampling unit 323 samples twice the frequency input from the external storage data 200 and transmits the sampling frequency to the first ASCII conversion unit 327.

The first signal converted in the first and second ASCII conversion units 327 and 328 is input to the artificial intelligence 420 and then the artificial intelligence 420 diagnoses a problematic noise source out of the noise or vibration.

The diagnosis result may be provided visually through a display unit 421 and a result resulting from application of the problematic noise to a band pass filter (BPF) in a sound reproducing unit 422 may be provided audibly.

On the other hand, the artificial intelligence may output the result of diagnosing the problematic noise source through the problematic noise diagnosis unit 310 of the portable device 300 and is capable of reproducing a sound for identification.

The portable device 300 refers to the controller 300-1 and the problematic noise diagnosis units 310.

Hereinafter, another exemplary embodiment of the present disclosure is described.

Figure 3:
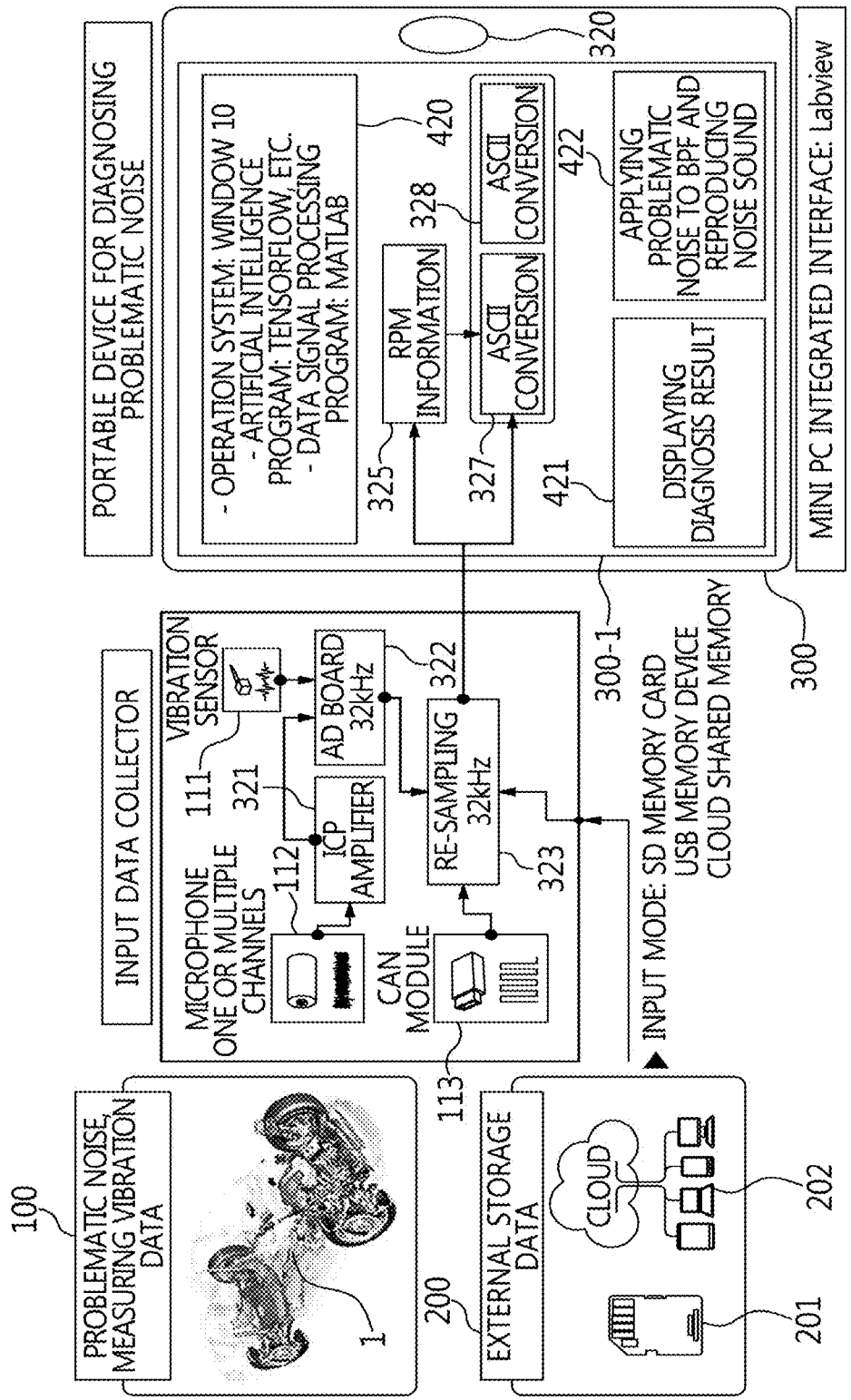
FIG. 3 is a diagram illustrating another exemplary embodiment of the present disclosure, in which an input data collector and a problematic noise diagnosis unit can be separated from each other.

FIG. 3 is a control logic according to another exemplary embodiment of the present disclosure, in which an input data collector 100 and a problematic noise diagnosis unit 320 can be separated from each other.

A device for diagnosing a problematic noise source of a vehicle 1 for a control logic according to an exemplary embodiment includes an input data collector 100, an external storage data 200, a portable device 300 and an artificial intelligence 420. In this case, the portable device 300 is capable of driving Window 10, an artificial intelligence specialized program, and MATLAB/Labview.

The input data collector 100 may comprise a microphone 112 for measuring noise of the vehicle, a vibration sensor 111 for acquiring vibration data of the vehicle, a CAN module 113, an ICP amplifier 321, an AD board 322, and a resampling unit 323 for acquiring engine speed of the vehicle.

The external storage data 200 comprises a memory 201 and a cloud network 202. The memory 201 stores problematic noise regions from the noise, vibration and engine speed data.

The portable device 300 includes a controller 300-1 and a problematic noise diagnosis unit 320. The controller 300-1 comprises an RPM information unit 325, a first ASCII conversion units 327, a second ASCII conversion units 328, a display unit 421, a sound reproducing unit 422 and an artificial intelligence 420.

The controller 300-1 converts the data into codes and receives a diagnosis result from the artificial intelligence 420.

The problematic noise diagnosis unit 320 diagnoses a problematic noise source out of the noise, vibration and engine speed based on the codes by deep learning of the artificial intelligence 420.

The input data collector 100 and the problematic noise diagnosis unit 320 or the controller 300-1 or the portable device 300 can be separated from each other.

An algorithm according to another exemplary embodiment of the present disclosure generally follows the following procedures.

The external storage data 200 outside the vehicle is prepared.

The external storage data 200 outside the vehicle is acquired and converted into a second code at the first and second ASCII conversion units 327 and 328 through resampling at the resampling unit 323.

At this time, the frequency of resampling may be twice the maximum frequency of the problematic noise.

In other words, as the resampling is necessary for preprocessing input data, the resampling may be performed such that the frequency thereof is twice the frequency band of the problematic noise.

For example, upon diagnosing the problematic noise below 16 kHz, the frequency of resampling is set to 32 kHz.

On the other hand, the external storage data 200 outside the vehicle may be transmitted to the vehicle CAN data of the CAN module 113 of the vehicle by Bluetooth.

The artificial intelligence 420 diagnoses a problematic noise source out of the noise or vibration based on the second code converted by deep learning at the first and second ASCII conversion units 327 and 328.

The problematic noise diagnosis unit 320 may comprise at least one of a display unit 421 or a sound generation unit 422.

The artificial intelligence 420 may output the result of diagnosing the problematic noise source to the display unit 421 visually and reproduce a sound for identification in the sound generation unit 422.

More specifically, the microphone 112 measures noise of the vehicle.

The vibration sensor 111 acquires vibration data.

The CAN module 113 acquires engine speed (RPM) of the vehicle.

The controller 300-1 is connected to the microphone 112, the vibration sensor 111 and the CAN module 113 to receive respective data.

The controller 300-1 converts the input data into codes and receives the diagnosis result from the artificial intelligence 420.

The artificial intelligence 420 diagnoses a problematic noise source out of the noise, vibration and engine speed based on the codes by deep learning.

In this case, the memory 201 may be utilized.

The memory 201 of the external storage data 200 is external data outside the vehicle, which contains noise, vibration and engine speed.

The memory 201 may be any one of an SD memory card, a USB memory, or any other cloud shared memory.

The controller 300-1 converts the data resampled from the memory 201 into codes and receives the diagnosis result from the artificial intelligence 420.

The artificial intelligence 420 can diagnose a problematic noise source out of the noise, vibration and engine speed based on the codes by deep learning.

On the other hand, a bidirectional method and a gated recurrent unit (GRU) technique are applied to the deep learning of the artificial intelligence 420.

The GRU refers to one of recurrent neural network (RNN) technique wherein it is possible to construct a learning model for the artificial intelligence, which follows time change, by means of the GRU.

Further, an attention mechanism technique may be applied to the deep learning of the artificial intelligence 420.

The attention mechanism technique can be used for improving information loss of past time data.

The attention mechanism technique refers to a learning technique that imparts weights to important feature vectors in the time axis.

In other words, the attention mechanism technique can establish an accurate learning model with respect to atypical noise by further imparting weights of important parts of learning data.

In this case, the attention mechanism technique may be applied in combination with a bidirectional recurrent neural network (RNN) (or GRU).

Further, an early stage ensemble learning technique may be applied to the deep learning of the artificial intelligence.

The early stage ensemble algorithm is a weighted learning technique that emphasizes importance of data in the past time among problems of the RNN that is a superordinate concept of GRU.

In other words, the early stage ensemble technique can be used for dividing weights for the initial time and weights for the final time evenly to keep information.

While the present disclosure has been described with respect to the specific embodiments, it will be apparent to those skilled in the art that various changes and modifications may be made without departing from the spirit and scope of the disclosure as defined in the following claims.

What is claimed is:

1. A method for diagnosing a problematic noise source based on big data information, comprising:
    measuring noise data of a powertrain of a vehicle by using a real-time noise measurement device and vibration data of the vehicle using a vibration sensor, and acquiring an engine speed (RPM) from controller area network (CAN) data of the vehicle, wherein the noise data, the vibration data or the engine speed of the vehicle is stored at external storage data outside the vehicle;
    converting the noise data, the vibration data, or the engine speed into a signal that can be input to a portable device for diagnosing the problematic noise source through an interface device, wherein the noise data, the vibration data, or the engine speed of the vehicle is resampled to obtain the converted signals, and a frequency of resampling is twice a maximum frequency of a problematic noise;
    analyzing the noise through a deep learning algorithm of an artificial intelligence on converted signals of the noise data, the vibration data, and the engine speed, and diagnosing, from the converted signals, the problematic noise source as a cause of the noise; and
    displaying the cause of the noise by outputting a diagnostic result as the problematic noise source, and transmitting the diagnostic result to the portable device.

2. The method according to claim 1, wherein the noise data is acquired through a microphone and the vibration data is acquired through the vibration sensor.

3. The method according to claim 2, wherein a bidirectional method and a gated recurrent unit (GRU) technique are applied to the deep learning algorithm.

4. The method according to claim 3, wherein an attention mechanism technique is applied to the deep learning algorithm.

5. The method according to claim 3, wherein an early stage ensemble learning technique is applied to the deep learning algorithm.

6. The method according to claim 5, wherein the artificial intelligence is configured to reproduce a sound for identification of the problematic noise source.

7. The method according to claim 1, wherein a bidirectional method and a gated recurrent unit (GRU) technique are applied to the deep learning algorithm.

8. The method of claim 7, wherein an attention mechanism technique is applied to the deep learning algorithm.

9. The method according to claim 8, wherein an early stage ensemble learning technique is applied to the deep learning algorithm.

10. The method according to claim 9, wherein the artificial intelligence is configured to reproduce a sound for identification of the problematic noise source.

11. The method according to claim 1, wherein the external storage data outside the vehicle is transmitted to the controller area network (CAN) data of the vehicle by Bluetooth.

12. A device for diagnosing a problematic noise source based on big data information, comprising:
    a microphone for measuring noise data of a vehicle;
    a vibration sensor for acquiring vibration data of the vehicle;
    a controller area network (CAN) module for acquiring an engine speed of the vehicle; and a controller for converting the noise data, the vibration data, and data regarding the engine speed of the vehicle into codes and receiving a diagnosis result from an artificial intelligence, wherein the noise data or the vibration data of the vehicle is stored at external storage data outside the vehicle, wherein the noise data, the vibration data, or the engine speed of the vehicle is resampled to obtain the converted codes, wherein a frequency of resampling is twice a maximum frequency of a problematic noise, and wherein the artificial intelligence diagnoses the problematic noise source based on the converted codes of the noise data, the vibration data or the engine speed by deep learning.

13. A device for diagnosing a problematic noise source based on big data information, comprising:
   an input data collector for collecting input data, the input data collector comprising:
      a microphone for measuring noise data of a vehicle;
      a vibration sensor for acquiring vibration data of the vehicle;
      a controller area network (CAN) module for acquiring an engine speed of the vehicle; and
      a memory for storing problematic noise regions from the noise data, the vibration data, and data regarding engine speed, wherein the noise data or the vibration data of the vehicle is stored at external storage data outside the vehicle;
   a controller for converting the noise data or vibration data into codes and receiving a diagnosis result from an artificial intelligence, wherein the noise data, the vibration data, or the engine speed of the vehicle is resampled to obtain the converted codes, and a frequency of resampling is twice a maximum frequency of a problematic noise; and
   a problematic noise diagnosis unit for diagnosing the problematic noise source based on the codes by deep learning of the artificial intelligence, wherein the artificial intelligence diagnoses the problematic noise source based on converted codes of the noise data, the vibration data or the engine speed by the deep learning,
   wherein the input data collector and the problematic noise diagnosis unit are separable from each other.

\* \* \* \* \*